United States Patent [19]

Shotaro et al.

[11] Patent Number: 4,556,789
[45] Date of Patent: Dec. 3, 1985

[54] MEASURING CIRCUIT FOR PHOTO-RECEIVING INTENSITY OF PHOTOSENSOR

[75] Inventors: Yokoyama Shotaro; Nishibe Takashi, both of Yokosuka, Japan

[73] Assignee: Fuji Electric Company, Ltd., Japan

[21] Appl. No.: 467,870

[22] Filed: Feb. 18, 1983

[30] Foreign Application Priority Data

Feb. 22, 1982 [JP] Japan .................. 57-25978

[51] Int. Cl.[4] .................. G01J 1/46; H01J 40/14
[52] U.S. Cl. .................. 250/206; 250/214 R; 250/214 P; 307/311; 356/226
[58] Field of Search .............. 250/206, 214 R, 214 P, 250/214 L; 356/215, 218, 223, 226; 307/311

[56] References Cited

U.S. PATENT DOCUMENTS

| | | | |
|---|---|---|---|
| 2,948,815 | 8/1960 | Willems et al. | 250/214 L |
| 3,574,443 | 4/1971 | Nanba | 356/226 X |
| 3,859,519 | 1/1975 | Weischedel | 250/214 L |
| 3,864,565 | 2/1975 | Kawasaki | 250/214 P |
| 4,320,302 | 3/1982 | Stein . | |

*Primary Examiner*—Edward P. Westin
*Attorney, Agent, or Firm*—Brumbaugh, Graves, Donohue & Raymond

[57] ABSTRACT

A measuring circuit for measuring the light intensity received by a photosensor comprises a photosensor which generates photocurrent proportional to the intensity of received light, an integration circuit for integrating the photocurrent generated and for measuring the intensity of light by measuring the time period from the start of integration until the integrated value reaches a predetermined level. In order to provide a wider dynamic output range, a signal generator which produces a monotonously changing voltage signal is connected to add its signal to the integrated signal.

3 Claims, 9 Drawing Figures

MEASURING CIRCUIT FOR PHOTO-RECEIVING INTENSITY OF PHOTOSENSOR

BACKGROUND OF THE INVENTION

This invention concerns a photo-receiving, intensity-time conversion element or device which can be used in an exposure meter, an illuminometer or an image sensor.

FIG. 1 is a circuit diagram showing one example of such a conversion device in the prior art.

A photosensor 1 (a photodiode is used in this case) is a photocurrent conversion device producing a photocurrent i, wherein the value of i depends on the photo-receiving intensity L. A capacitor 2 is charged by said photocurrent i to integrate said photocurrent. Assuming the capacitance of the capacitor 2 is C, a voltage $V_1$ as shown by the following equation is applied as an input to an inverter 3:

$$V_1 = 1/C \int i \, dt \quad (1)$$

In operation, the capacitor 2 is initially discharged to $V_1=0$, by means not shown, causing the inverter to produce an output "1". As the capacitor 2 starts to charge, the photo-receiving intensity L is determined by determining the period of time $t_0$ until the output from the inverter 3 is turned to "0". Now, by setting the photocurrent as $i=AL$, where A is a constant, assuming that the current is approximately proportional to the intensity L, the input voltage $V_1$ for the inverter 3 can be represented by the following equation:

$$V_1 = ALt/C \quad (2)$$

Then, by setting a threshold voltage for the inverter 3 as $V_{th}$ and the time required to arrive at the state $V_1 = V_{th}$ as $t_0$, the above equation (2) equals:

$$t_0 = CV_{th}/AL \quad (3)$$

Since the photo-receiving intensity L usually varies in a wide range, if the intensity L varies by a factor of $10^6$ between its maximum and minimum levels, the conversion time $t_0$ also varies by the factor of $10^6$ between its maximum and minimum values according to the above equation (3). This means that the maximum conversion time is as great as one second even if the minimum conversion time is set to one sec. Such a conversion time renders the device impossible for practical use. Thus, prior art devices suffer the drawback that the range for the photo-receiving intensity being capable of measurement is narrowed, which thereby narrows the dynamic range.

SUMMARY OF THE INVENTION

This invention has been made in view of the foregoing and it is an object thereof to provide a photo-receiving, intensity-time conversion device or measuring circuit with a wider dynamic range.

The object of this invention is to widen the range for the photo-receiving intensity being capable of measurement by connecting a voltage generation means for generating a monotonously increasing or decreasing voltage and supplying it to a junction point between a photosensor and a capacitor by way of another capacitor.

DETAILED DESCRIPTION OF THE PREFERRED EMBODIMENTS

Figure 1:
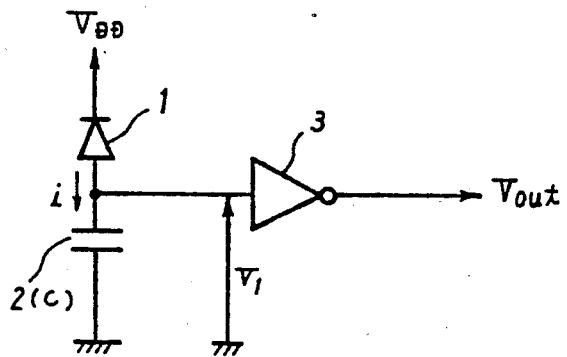
FIG. 1 is a circuit diagram of a conventional charge and discharge circuit.
Figure 2:
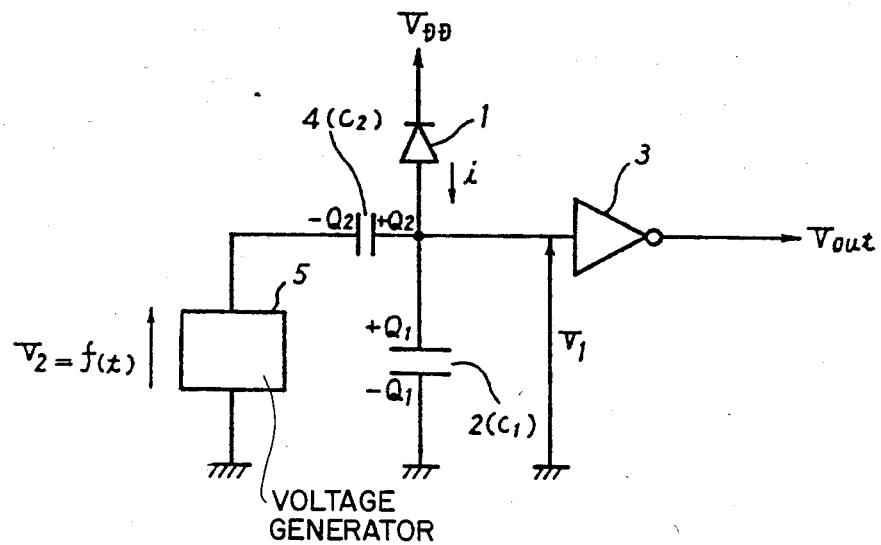
FIG. 2 is a circuit diagram of a first embodiment in accordance with the invention.

As shown in FIG. 2, this embodiment comprises a structure wherein a capacitor 4 and a voltage generation means 5 are added to the circuit shown in FIG. 1. While no specific structure is shown for the voltage generation means 5, any known device can be used so long as it can generate a monotonously increasing voltage: $V_2 = f(t)(df(t)/dt > 0)$ irrespective of the incident light intensity. A simple CR charging circuit is one example.

The circuit shown in FIG. 2 operates in the following manner. In the initial state, with $V_1 = V_2 = 0$, electric charges accumulate in the capacitors 2 and 4 as $Q_1$, $Q_2$, respectively, and a photocurrent flows through the photosensor 1 as i, as represented by the following equations:

$$\int i \, dt = Q_1 + Q_2 \quad (4)$$

$$Q_1/C_1 = Q_2/C_2 + f(t) \quad (5)$$

By eliminating $Q_2$ from the equations (4) and (5), the equation (6) is obtained, where $C_1$, $C_2$ represent the capacitance of the capacitors 2, 4, respectively.

$$V_1 = Q_1/C_1 \quad (6)$$
$$= \frac{1}{C_1 + C_2} \int i \, dt + \frac{C_2}{C_1 + C_2} f(t)$$

That is, the input voltage $V_1$ to the inverter 3 is represented by the sum of the voltage due to the photocurrent and the voltage from the voltage generation means irrelevant of the photocurrent. Since f(t) monotonously increases, $V_1$ reaches $V_{th}$ by the elapse of a certain time even if the current i is considerably small. In other words, since the f(t)-depending component is predominant in the small range of the current i, where the time required for the voltage $V_1$ to reach the threshold voltage is not so long, the ratio between the maximum and minimum values of the time $t_0$ can be decreased to less than $10^6$ even if the current i changes, for example, by the factor of $10^6$ between the minimum and the maximum levels. That is, if the intensity of the incident light varies over a wide range, the conversion time can be set to a practical range to thereby widen the dynamic range.

Figure 3:
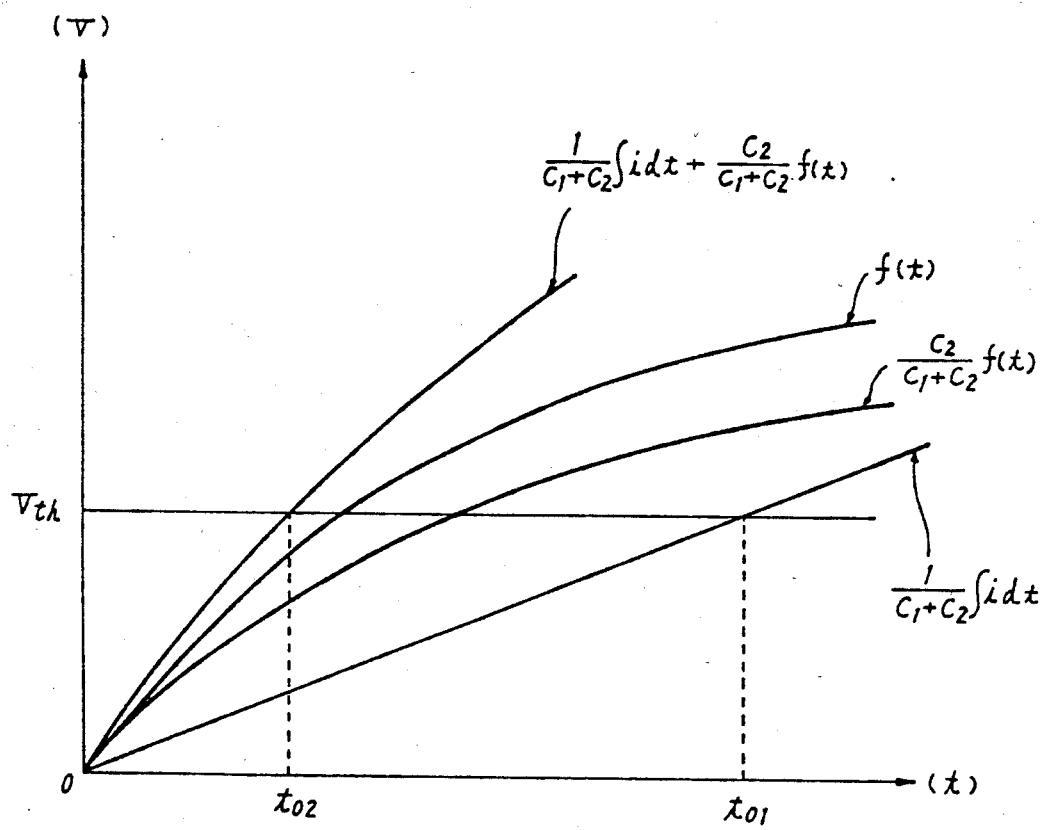
FIG. 3 is a graph showing the voltage characteristics against time for various circuits.

FIG. 3 is a graph showing the change in the voltage relative to the time. As shown in the graph, f(t) represents one example for a monotonously increasing function, which can be obtained, for example, by a simple CR charging circuit as described above. While the time required for the voltage $V_1$ to increase to $V_{th}$ is $t_{01}$ when $V_2=f(t)$ is not given (f(t)=0), the time is reduced to $t_{02}$ if f(t) is applied. Specifically, even if the current i is too small to increase the time $t_{01}$ to a practical value, the time can be reduced ($t_{02}$ $t_{01}$) and set to a practical range by applying the monotonously increasing voltage as in this invention. Accordingly, the range for the intensity of the incident light capable of measurement can be widened, that is, the dynamic range can be widened.

Figure 4:
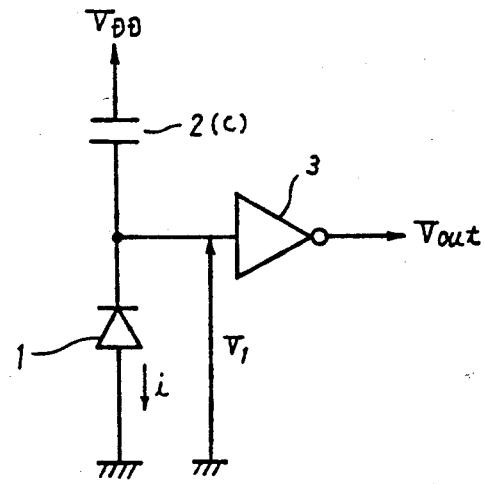
FIG. 4 is a circuit diagram of a conventional charge and discharge unit.

FIG. 4 is a circuit diagram showing the second example of a charge and discharge circuit of the prior art.

In this case, the photosensor 1 and the capacitor 2 in FIG. 1 are reversed in their position and the operation is also reversed to that shown in FIG. 1. The initial state for the voltage $V_1$ is at first set to $V_{DD}$ (power source voltage) (the inverter 3 shows an output at "0"), and then the voltage $V_1$ is lowered by the flow of the photocurrent i through the photosensor 1 and one measures the time required for $V_1$ to decrease lower than $V_{th}$, that is, the time during which the output from the inverter 3 is turned to "1". This circuit has the same disadvantage of narrow dynamic range as the prior art circuit shown in FIG. 1.

Figure 5:
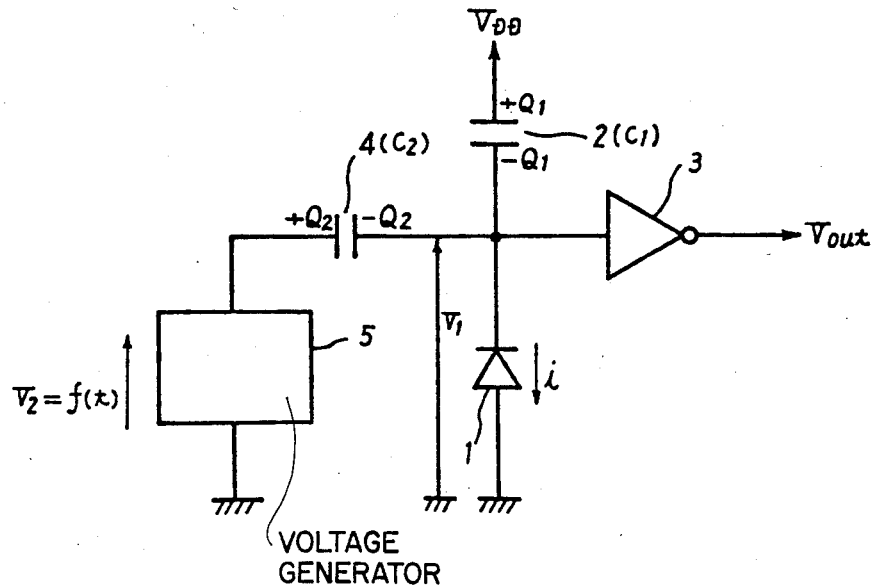
FIG. 5 is a circuit diagram of a second embodiment according to the invention.

FIG. 5 is a circuit diagram showing the second embodiment of this invention corresponding to that shown in FIG. 4.

As shown in FIG. 5, the embodiment has a structure where a capacitor 4 and a voltage generation means 5 are added to the circuit shown in FIG. 4. The function f(t) is different from that shown in FIG. 2 but may be any one so long as it monotonously decreases (df(t)/dt<0). A simple CR discharging circuit is one example.

The operation of the circuit is explained. At the initial stage, by setting $V_1=V_2=V_{DD}$ (power source voltage) and by setting $Q_1$, $Q_2$ in the same manner as in FIG. 2, relations as shown by the following equations can be established:

$$\int idt = Q_1 + Q_2 \quad (7)$$

$$V_{DD} - Q_1/C_1 = f(t) - Q_2/C_2 \quad (8)$$

By eliminating $Q_2$ from the equations (7) and (8) the equation (9) can be obtained:

$$V_{DD} - V_1 = Q_1/C_1 \quad (9)$$

$$= \frac{1}{C_1 + C_2} \int idt + \frac{C_2}{C_1 + C_2} (V_{DD} - f(t))$$

The equation (9) is in symmetry to the above equation (6) and, accordingly, the dynamic range can be widened for the same reasons as described above.

Figure 6:
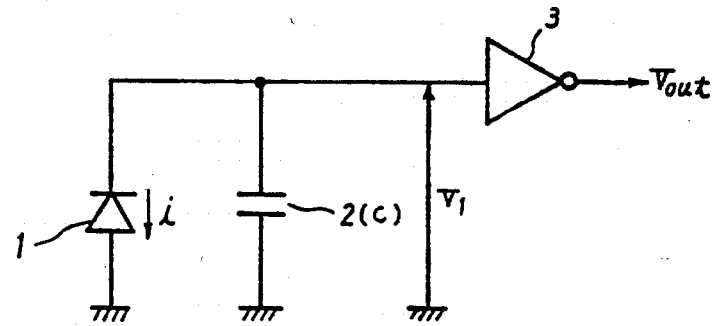
FIG. 6 is a circuit diagram of a conventional charge and discharge unit.

FIG. 6 is a circuit diagram showing the third example of the charge and discharge circuit in the prior art. In this case, the capacitor 2 is at first charged to a power source voltage $V_{DD}$ by means not shown (inverter 3 then issues an output at "0"), and then the electric charge accumulated in the capacitor 2 is discharged by way of the photocurrent i through the photosensor 1. The time required for the voltage $V_1$ to decrease lower than $V_{th}$ is measured, that is, the period during which the output from the inverter 3 is turned to "1". The circuit also suffers the drawback of narrow dynamic range as in the first and the second examples in the prior art.

Figure 7:
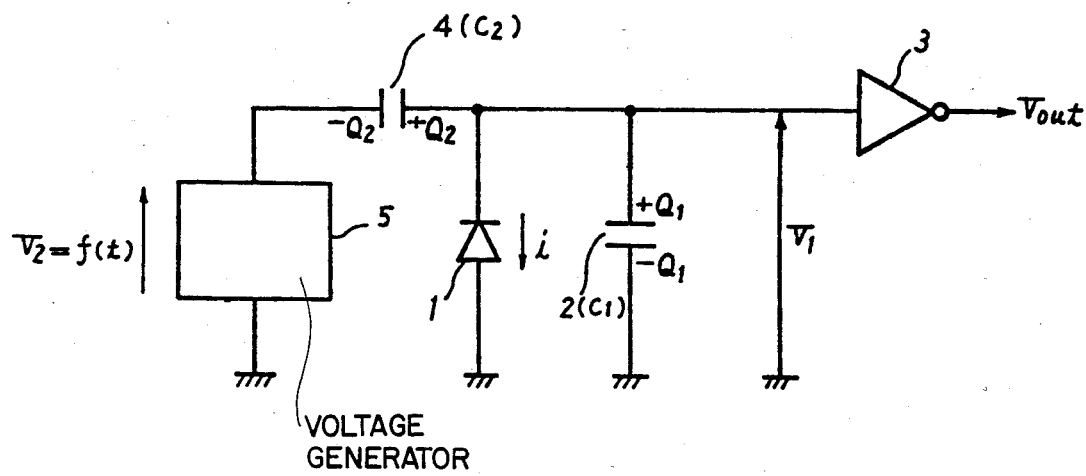
FIG. 7 is a circuit diagram of a third embodiment according to the invention.

FIG. 7 is a circuit diagram showing the third embodiment of this invention corresponding to FIG. 6.

As is apparent from the drawing, the embodiment has a structure in which a capacitor 4 and a voltage generation means 5 are added to the circuit shown in FIG. 6. The function f(t) is monotonously decreasing function similar to that shown in FIG. 5.

The operation of the circuit is explained. At the initial state, by setting the voltage as $V_1=V_2=V_{DD}$ and then setting each of the factors shown by the symbols in the same manner as in FIG. 5, the following relations are established:

$$Q_0 = Q_1(t=0) = C_1 V_{DD} \quad (10)$$

$$Q_0 - \int idt = Q_1 + Q_2 \quad (11)$$

$$Q_1/C_1 = Q_2/C_2 + f(t) \quad (12)$$

By eliminating $Q_0$, $Q_1$, $Q_2$ from the equations (10), (11), (12), respectively, the following equation can be obtained:

$$V_{DD} - V_1 = 1/(C_1+C_2)\int idt + C_2/(C_1+C_2)(V_{DD}-f(t)) \quad (13)$$

The equation (13) is equal to the above equation (7) and, accordingly, the dynamic range can be widened for the same reasons as described above.

Figure 8:
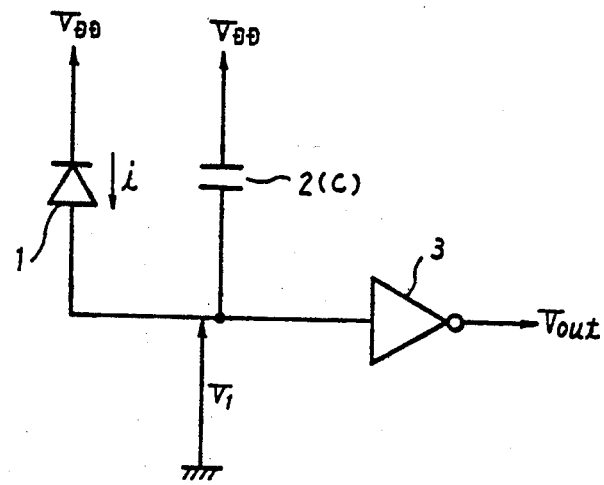
FIG. 8 is a circuit diagram of a conventional charge and discharge unit.

FIG. 8 is a circuit diagram showing the fourth example of the charge and discharge circuit in the prior art.

In this case, the capacitor 2 is at first charged so as to attain the voltage $V_1=0$ by means not shown (inverter 3 issues an output at "1"). Then, the electric charge accumulated in the capacitor is discharged by the flow of the photocurrent i through the photosensor to measure the time required for the voltage $V_1$ to increase higher than $V_{th}$, that is, the time during which the output of the inverter 3 is turned to "0". The circuit also has a drawback of narrow dynamic range as in the first through third examples of the prior art devices.

Figure 9:
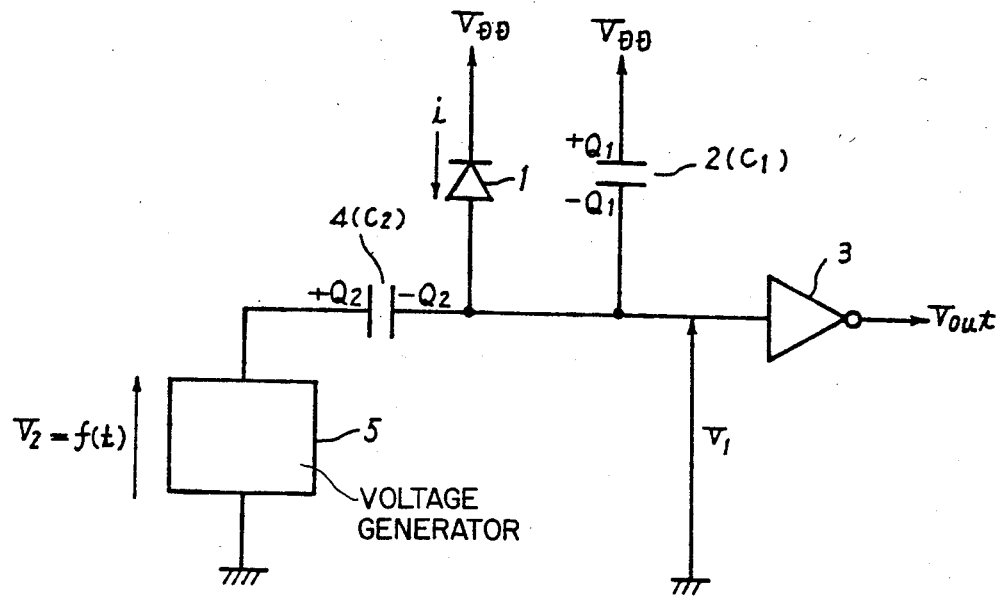
FIG. 9 is a circuit diagram of a fourth embodiment according to the invention.

FIG. 9 is a circuit diagram showing the fourth embodiment of this invention corresponding to FIG. 8.

As is apparent from the drawing, this embodiment comprises a structure wherein the capacitor 4 and the voltage generation means 5 are added to the circuit shown in FIG. 8. The function f(t) is a monotonously increasing function similar to that shown in FIG. 2.

The operation of the circuit is explained. At the initial stage, by setting $V_1=V_2=0$, the following equations can be established:

$$Q_0 = Q_1(t=0) = C_1 V_{DD} \quad (14)$$

$$Q_0 - \int idt = Q_1 + Q_2 \quad (15)$$

$$f(t) - Q_2/C_2 + Q_1/C_1 = V_{DD} \quad (16)$$

By eliminating $Q_0$, $Q_1$ and $Q_2$ from the equations (14), (15) and (16), respectively, the equation (17) is obtained:

$$V_1 = 1/(C_1+C_2)\int idt + C_2/(C_1+C_2) f(t) \quad (17)$$

The equation 17 is equal to the above equation (6) and, accordingly, the dynamic range can be widened for the same reasons as described above.

As stated above, according to this invention, wherein a voltage generation means for generating a predetermined voltage is connected to a charge and discharge circuit comprising a photosensor and a capacitor by way of another capacitor, an advantage is provided in that the change with time in the output voltage from the charge and discharge circuit is not so delayed, even within a range where the photocurrent is extremely small and, accordingly, the dynamic range thereof can be widened.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

We claim:

1. A measuring circuit for measuring the light intensity received by a photo-receiving photosensor, comprising:

a photosensor for receiving light and for generating photocurrent depending on the intensity of received light;

an integration means for integrating the photocurrent through said photosensor and which is adapted to measure the photo-receiving intensity by measuring the period of time from the instance of the start of integration to the time at which the integrated value reaches a predetermined lèvel in said integration means; and a signal generation means for generating a signal which changes with time in the same direction as the integrated value, and wherein said generation means is connected to add its output signal to said integrated value.

2. The measuring circuit as described in claim 1, wherein said integration means comprises a first capacitor connected to said photosensor which is charged and discharged in responsee to the photocurrent in said photosensor, and wherein said signal generation means comprises a voltage generation means for generating a voltage which increase or decreases as a function of time and is connected to add its output signal to the charged and discharged value of said first capacitor, and wherein said measuring circuit further includes a second capacitor connected to the junction point between said photosensor and said first integrating capacitor.

3. The measuring circuit as described in claim 1 or 2, further including a threshold device which is set when the integration starts and reset when the integrated value reaches the predetermined value to provide a pulse which starts and ends at the respective setting and resetting thereof, and wherein the photo-receiving intensity is measured in dependence on the pulse width.

* * * * *